United States Patent
Wallrafen

Patent Number: 5,737,243
Date of Patent: Apr. 7, 1998

[54] METHOD FOR DISPLAYING OF THE OUTSIDE TEMPERATURE IN A MOTOR VEHICLE

[75] Inventor: Werner Wallrafen, Sulzbach, Germany

[73] Assignee: VDO Adolf Schindling AG, Frankfurt, Germany

[21] Appl. No.: 800,288

[22] Filed: Feb. 13, 1997

Related U.S. Application Data

[63] Continuation of Ser. No. 303,720, Sep. 9, 1994, abandoned.

[30] Foreign Application Priority Data

Oct. 8, 1993 [DE] Germany ............... 43 34 356.2

[51] Int. Cl.$^6$ ........................... G01K 1/20
[52] U.S. Cl. ............... 364/557; 364/423.098; 340/449; 340/588; 374/142; 374/144
[58] Field of Search ............ 364/557, 423.098; 340/449, 588; 374/102, 142, 144, 170; 236/91 F; 318/471, 473

[56] References Cited

U.S. PATENT DOCUMENTS

| | | | |
|---|---|---|---|
| 4,309,759 | 1/1982 | Tokuda et al. | 364/431.05 |
| 4,317,106 | 2/1982 | Huber | 340/462 |
| 4,381,480 | 4/1983 | Hara et al. | 318/471 |
| 4,442,424 | 4/1984 | Shirasaki et al. | 374/144 |
| 4,520,258 | 5/1985 | Grohmann | 392/307 |
| 4,551,801 | 11/1985 | Sokol | 364/424.03 |
| 4,770,543 | 9/1988 | Burghoff et al. | 374/142 |
| 4,832,258 | 5/1989 | Hoshino et al. | 236/13 |
| 4,853,693 | 8/1989 | Eaton-Williams | 340/588 |
| 4,857,889 | 8/1989 | Terano et al. | 340/461 |
| 5,001,656 | 3/1991 | Zimmerman et al. | 364/557 |
| 5,050,110 | 9/1991 | Rott | 364/557 |
| 5,309,139 | 5/1994 | Austin | 340/462 |
| 5,416,728 | 5/1995 | Rudzewicz et al. | 364/557 |

*Primary Examiner*—Emanuel T. Voeltz
*Assistant Examiner*—Eric W. Stamber
*Attorney, Agent, or Firm*—Martin A. Farber

[57] ABSTRACT

A method for displaying the outside temperature within a motor vehicle in which measured values of the outside temperature are displayed with a greater time delay in the case of increasing temperature on an outside-temperature sensor than in the case of a decreasing temperature. In order to suppress erroneous display of the outside temperature, the time delay is varied as a function of the temperature of the engine.

10 Claims, 2 Drawing Sheets

METHOD FOR DISPLAYING OF THE OUTSIDE TEMPERATURE IN A MOTOR VEHICLE

RELATED APPLICATION

This application is a continuation of my application Ser. No. 08/303,720 filed Sep. 9, 1994, now abandoned.

FIELD AND BACKGROUND OF THE INVENTION

The present invention relates to a method for displaying the outside temperature in a motor vehicle, by which method measured values of the outside temperature are displayed with a time delay which is greater upon an increase of the temperature on an outside-temperature sensor than in the case of a decrease in the temperature.

For the measuring of the outside temperature in motor vehicles, outside-temperature sensors are arranged in the regions of the bumpers of the vehicle. As a result of this arrangement, an outside-temperature sensor is subject to the heat radiated by the engine.

This proximity to the engine results in the displaying of erroneous values of the outside temperature in the vehicle. Thus, for instance, driving at dead-slow speed or stop-and-go traffic results in an indicating of an outside temperature which is higher than the outside temperature (far from the vehicle) actually is.

A method is known by which the display of the outside temperature is controlled as a direct function of the speed of the vehicle. Below a predetermined limit speed, the last temperature value detected is stored and displayed continuously, while as from an upper-limit speed the actually measured temperature is displayed with a delay time which is directly dependent on the speed of the vehicle.

That method has the disadvantage that the outside temperature displayed is incorrect under all practical operating conditions.

SUMMARY OF THE INVENTION

It is an object of the invention better to suppress the error in the display of the outside temperature within the vehicle whatever the operating condition of the vehicle is.

According to the invention, the time delay is changed as a function of the temperature of the engine.

The invention has the advantage that the display takes place as a function of the factor causing the known errors. Thus, reaction to the operating condition which is actually present at the time is possible.

The delay time advantageously becomes longer upon an increase in the temperature of the engine. The simplest way is to develop a limit-value switch with which, when a given temperature of the engine is exceeded with increasing outside-temperature signals, switching is effected to a longer delay time. A continuous transition can be realized by a proportional relationship between the temperature of the engine and the delay time.

Another embodiment makes it possible to determine the delay time as a function of the speed of the vehicle in the case of increased temperature of the engine. In this way, a more precise adaptation of the delay time to the existing state of operation of the motor vehicle is possible.

In one embodiment, the delay time is less the greater the speed of the vehicle, since the radiated heat is led away from the temperature sensor with increasing speed.

According to a feature of the invention, the delay time assumes a lower limit value up to a specific engine temperature.

A further feature of the invention is that the temperature of the engine is determined via the cooling water temperature.

The invention also provides an arrangement for the carrying out of the method wherein sensors for the measuring of the temperature outside the motor vehicle as well as the temperature of the engine are connected via an analog-digital converter to a microcomputer. A program in accordance with the method of the invention is provided for the microcomputer.

BRIEF DESCRIPTION OF THE DRAWING

With the above and other objects and advantages in view, the present invention will become more fully understood in connection with the detailed description of a preferred embodiment when considered with the accompanying drawing, of which.

DETAILED DESCRIPTION OF THE PREFERRED EMBODIMENT

Figure 1:
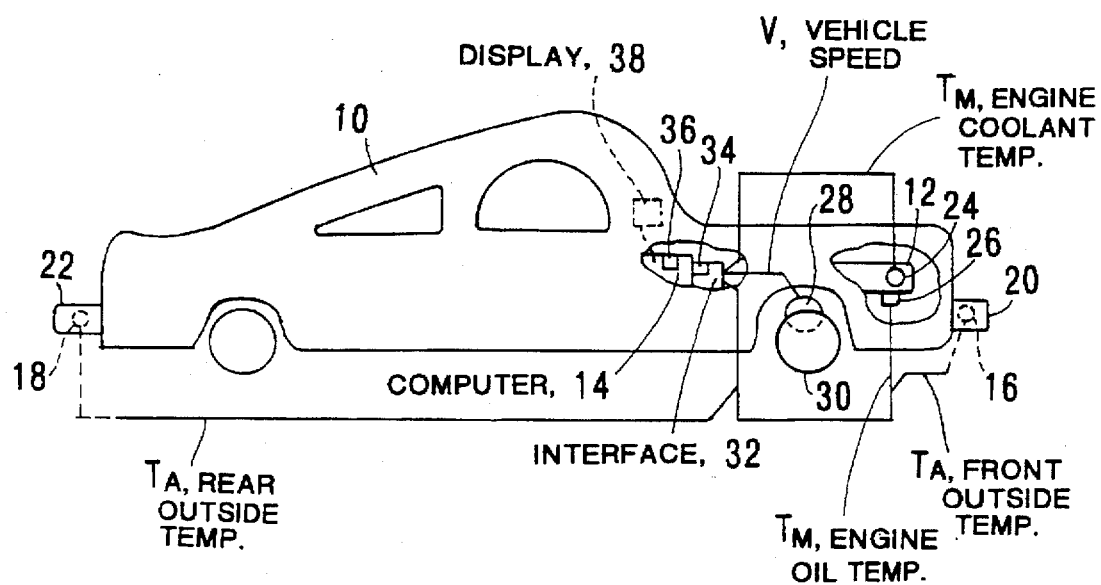
FIG. 1 shows a stylized view of an automobile, partially cut away to show apparatus for practice of the invention.

FIG. 1 shows a motor vehicle 10, such as an automobile, having an engine 12 for powering the vehicle 10. Included in the vehicle 10 is a computer (or microcomputer) 14 for providing functions useful in the driving of the vehicle 10. Sensors 16 and 18 of outside temperature are located respectively in front and rear bumpers 20 and 22 of the vehicle 10. A sensor 24 of engine coolant temperature and a sensor 26 of engine oil temperature are mounted to the engine 12. A vehicle speed sensor 28 connects mechanically or electro-magnetically with a wheel 30 of the vehicle 10. An interface circuit 32 having an analog/digital converter 34 provides for coupling of signals from the sensors 16, 18, 24, 26 and 28 to the computer 14, the coupling being indicated diagrammatically in FIG. 1. A delay unit 36 within the computer 14 is employed, in accordance with the invention, for presentation of outside temperature upon a display 38 in the vehicle 10. While four temperature sensors 16, 18, 24 and 26 are shown for purposes of explaining the practice of the invention, it is to be understood that a lesser number of temperature sensors may be employed as will become apparent from the following description of the operation of the invention.

A rapid outside-temperature sensor such as the sensor 16 or 18 located in the bumper of the motor vehicle supplies an outside-temperature signal $T_A$. In this connection, the sensor also converts the extreme temperature fluctuations produced by the heat of radiation of the engine, which may amount to up to ±10° C., into correspondingly rapid signals.

Furthermore, a temperature sensor, such as the sensor 24 or the sensor 26, for the measurement of the temperature of the engine is present in the vehicle for supplying corresponding signals concerning the existing engine temperature $T_M$.

The engine temperature $T_M$ can preferably be determined indirectly via the cooling-water temperature provided by the sensor 24. Determination via the temperature of the engine oil is available via the sensor 26.

Figure 2:
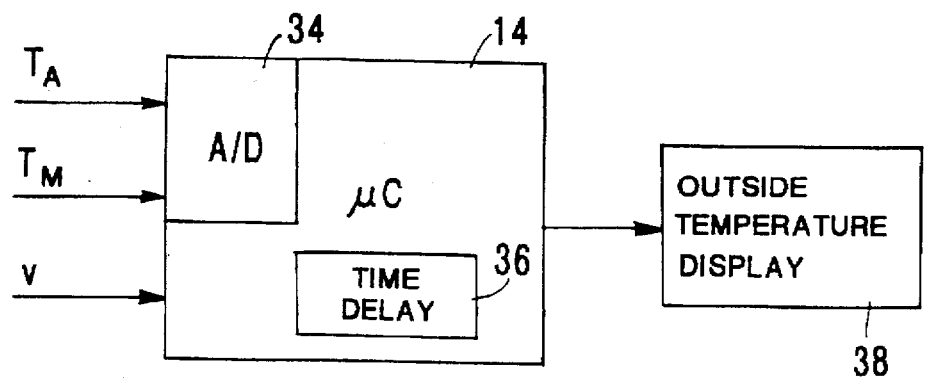
FIG. 2 shows a system for carrying out the method of the invention.

In accordance with FIGS. 1 and 2, the outside-temperature and engine-temperature sensors are connected to the analog/digital (A/D) converter 34. The signals $T_A$, $T_M$ provided to the analog/digital converter 34 as well as the frequency signal v representing the speed of the vehicle which is supplied by the speed sensor 28 are sent to the microcomputer (μc) 14 which controls the display of the outside temperature.

Figure 3:
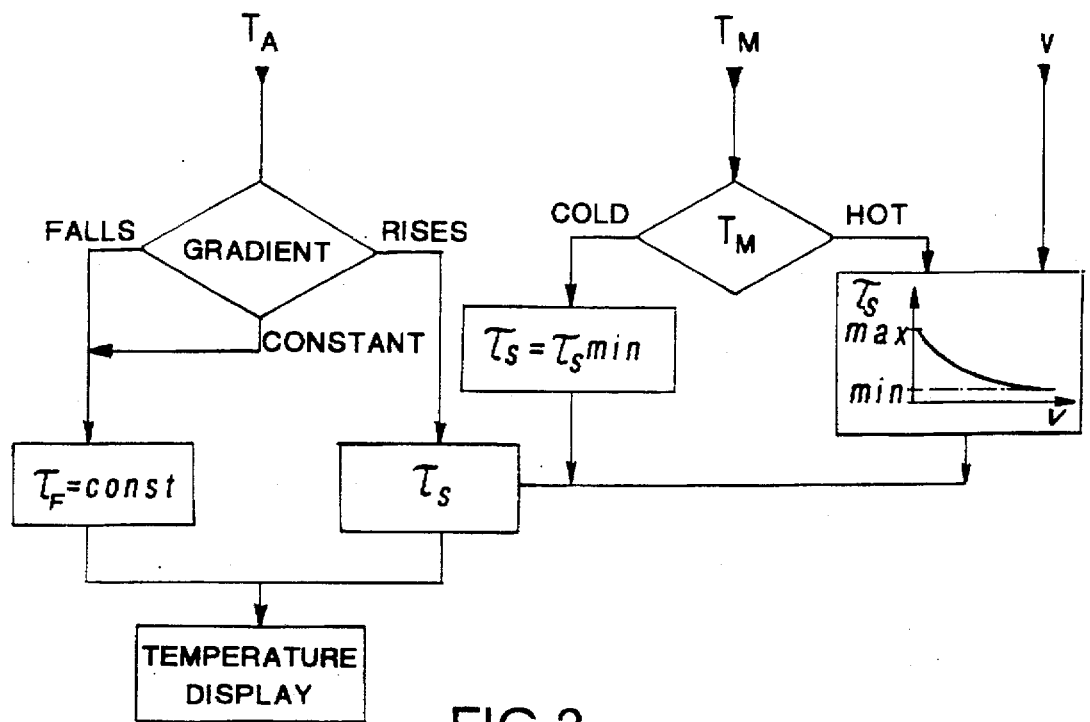
FIG. 3 is a flowchart of a program intended for a microcomputer in the system of FIG. 1.

In the method shown in FIG. 3, the outside-temperature sensor supplies an electric signal $T_A$ which corresponds to the temperature in the vicinity of the sensor. The sensor signal $T_A$ is displayed with a different time delay, provided by the delay unit 36, depending on whether the outside temperature is decreasing or increasing within a given period of time.

Upon decreasing or constant temperature a constant damping-time constant $\tau_f$ applies while with increasing outside temperatures a variable damping-time constant $\tau_s$ is applied.

The delay time represented by the damping-time constant $\tau_s$ is determined as a function of the temperature $T_M$ of the engine and the speed v of the vehicle.

If the engine is cold ($T_M \leq 35°$ C.), the delay time assumes a fixed lower limit value $\tau_{smin}$. If the engine temperature $T_M$ is more than 35° C., the delay time $\tau_s$ is still determined as a function of the speed v of the vehicle. The damping-time constant $\tau_s$ is in this case smaller the higher the speed v.

In the direction of decreasing temperature, a small time constant (for instance $\tau_F \sim 1$ to 30 sec) is provided as damping of the display. In the direction of increasing temperature, with hot engine and low speed of travel v, an extremely long time constant ($\tau_s \sim 1$ to 5 min) will be active in order also to display actual increases in temperature in contrast to the temperature fluctuations coming from the engine.

In one variant of the invention which does not take the speed of the vehicle into account, the damping-time constant $\tau_s$ is selected at 30 seconds up to an engine temperature $T_M$ of 35° C. After this, there is a linear increase to 5 minutes in the case of an engine temperature $T_M$ of 120° C.

In the simplest case, the engine temperature $T_M$ of 35° C. constitutes a threshold value which permits selection between two different constant damping-time constants.

I claim:

1. A method for displaying outside temperature in a motor vehicle, the vehicle having an engine, an outside-temperature sensor, and an engine-temperature sensor, the method comprising the steps of:

measuring the outside temperature by means of said outside-temperature sensor;

displaying measured values of the outside temperature;

interposing a time delay between said measuring step and said displaying step;

selecting a first value of the time delay to be employed in said interposing step upon a decrease of the outside temperature, and selecting a second value of the time delay to be employed in said interposing step upon an increase of the outside temperature, said second value of time delay being greater than said first value of time delay; and changing said second value of the time delay as a function of a temperature of the engine as sensed by the engine temperature sensor.

2. A method according to claim 1, wherein, in said changing step, the second value of time delay increases upon an increase in the temperature of the engine.

3. A method according to claim 2, wherein, the second value of the time delay increases proportionally with the temperature of the engine.

4. A method according to claim 2, wherein in said changing step, said second value of the time delay assumes a lower limit value up to a specific engine temperature.

5. A method according to claim 1, further comprising a step of altering said second value of the time delay as a function of a speed of the vehicle upon an increase in temperature of the engine.

6. A method according to claim 5, wherein the vehicle includes a vehicular speed sensor, and in said changing step, said second value of the time delay is decreased upon an increase in the speed of the vehicle as sensed by the vehicular speed sensor.

7. A method according to claim 1, wherein said changing step includes a step of determining the temperature of the engine with said engine temperature sensor by a measuring of a cooling water temperature of the vehicle.

8. A method for displaying outside temperature in a motor vehicle, the vehicle having an engine, an outside-temperature sensor, and an engine-temperature sensor, the method comprising the steps of:

measuring the outside temperature by means of said outside-temperature sensor;

displaying measured values of the outside temperature;

interposing a time delay between said measuring step and said displaying step;

selecting a first value of the time delay to be employed in said interposing step upon a decrease of the outside temperature, and selecting a second value of the time delay to be employed in said interposing step upon an increase the outside temperature; and changing said second value of the time delay as a function of a temperature of the engine as sensed by the engine temperature sensor.

9. A system operative with a motor vehicle, and providing for measurement and display of temperature upon interposition of a time delay between measurement and display, the system comprising:

a first sensor for measuring temperature outside the vehicle;

a second sensor for measuring temperature of an engine of the vehicle;

a computer, and an analog-digital converter connecting said first sensor and said second sensor to said computer; and wherein said computer is operated by a program having the steps of:

reading a measurement of the outside temperature;

providing a time delay subsequent to said reading step;

following said time delay, activating a display to display measured values of the outside temperature;

selecting a first value of the time delay to be employed in said providing step upon a decrease of the outside temperature, and selecting a second value of the time delay to be employed in said providing step upon an increase of the outside temperature, said second value of time delay being greater than said first value of time delay; and changing said second value of the time delay as a function of the temperature of the engine.

10. A system operative with a motor vehicle, and providing for measurement and display of temperature upon interposition of a time delay between measurement and display, the system comprising:

a first sensor for measuring temperature outside the vehicle;

a second sensor for measuring temperature of an engine of the vehicle;

a computer, and an analog-digital converter connecting said first sensor and said second sensor to said computer; and wherein said computer is operated by a program having the steps of:

reading a measurement of the outside temperature;

providing a time delay subsequent to said reading step;

following said time delay, activating a display to display measured values of the outside temperature;

selecting a first value of the time delay to be employed in said providing step upon a decrease of the outside temperature, and selecting a second value of the time delay to be employed in said providing step upon an increase of the outside temperature; and changing said second value of the time delay as a function of the temperature of the engine.

* * * * *